US009811466B2

(12) United States Patent
Guthrie et al.

(10) Patent No.: US 9,811,466 B2
(45) Date of Patent: *Nov. 7, 2017

(54) EXPEDITED SERVICING OF STORE OPERATIONS IN A DATA PROCESSING SYSTEM

(71) Applicant: INTERNATIONAL BUSINESS MACHINES CORPORATION, Armonk, NY (US)

(72) Inventors: Guy L. Guthrie, Austin, TX (US); Hugh Shen, Round Rock, TX (US); Jeffrey A. Stuecheli, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/839,310

(22) Filed: Aug. 28, 2015

(65) Prior Publication Data

US 2017/0060746 A1 Mar. 2, 2017

(51) Int. Cl.
*G06F 12/08* (2016.01)
*G06F 12/0842* (2016.01)
*G06F 12/0811* (2016.01)
*G06F 12/0831* (2016.01)
*G06F 12/0875* (2016.01)

(52) U.S. Cl.
CPC ...... *G06F 12/0842* (2013.01); *G06F 12/0811* (2013.01); *G06F 12/0831* (2013.01); *G06F 12/0875* (2013.01); *G06F 2212/283* (2013.01); *G06F 2212/452* (2013.01); *G06F 2212/621* (2013.01)

(58) Field of Classification Search
CPC ............ G06F 12/0842; G06F 12/0875; G06F 12/0811; G06F 12/0831; G06F 2212/452; G06F 2212/283; G06F 2212/621
See application file for complete search history.

(56) References Cited

U.S. PATENT DOCUMENTS

| 6,675,195 B1 | 1/2004 | Chatterjee |
| 7,284,102 B2 | 10/2007 | Guthrie et al. |
| 9,203,927 B1 | 12/2015 | Mecklenberg At Al |

(Continued)

OTHER PUBLICATIONS

Guthrie et al. U.S. Appl. No. 14/839,241, filed Aug. 28, 2015, Non-Final Office Action dated Jun. 28, 2017.

(Continued)

*Primary Examiner* — Zhuo Li
(74) *Attorney, Agent, or Firm* — Brian F. Russell; Steven L. Bennett

(57) ABSTRACT

In at least some embodiments, a processor core generates a store operation by executing a store instruction in an instruction sequence. The store operation is marked as a high priority store operation in response to detecting, in the instruction sequence, a barrier instruction that precedes the store instruction in program order and that includes a field set to indicate the store operation should be accorded high priority and is not so marked otherwise. The store operation is buffered in a store queue associated with a cache memory of the processor core. Handling of the store operation in the store queue is expedited in response to the store operation being marked as a high priority store operation and not expedited otherwise.

13 Claims, 8 Drawing Sheets

(56) References Cited

U.S. PATENT DOCUMENTS

| | | |
|---|---|---|
| 9,547,598 B1 | 1/2017 | Kamowski et al. |
| 9,632,942 B2 | 4/2017 | Guthrie et al. |
| 9,632,943 B2 | 4/2017 | Guthrie et al. |
| 9,645,937 B2 | 5/2017 | Guthrie et al. |
| 9,652,399 B2 | 5/2017 | Guthrie et al. |
| 2007/0288694 A1 | 12/2007 | Ghai et al. |
| 2009/0138683 A1 | 5/2009 | Capps, Jr. et al. |
| 2010/0312968 A1 | 12/2010 | Hikichi |
| 2012/0179876 A1 | 7/2012 | Ghai et al. |
| 2017/0060746 A1 | 3/2017 | Guthrie et al. |
| 2017/0060756 A1* | 3/2017 | Guthrie ............... G06F 12/0875 |
| 2017/0060757 A1* | 3/2017 | Guthrie ............... G06F 12/0875 |
| 2017/0060758 A1* | 3/2017 | Guthrie ............... G06F 12/0875 |
| 2017/0060759 A1* | 3/2017 | Guthrie ............... G06F 12/0875 |
| 2017/0060760 A1* | 3/2017 | Guthrie ............... G06F 12/0875 |
| 2017/0060761 A1* | 3/2017 | Guthrie ............... G06F 12/0842 |
| 2017/0060762 A1* | 3/2017 | Guthrie ............... G06F 12/0875 |

OTHER PUBLICATIONS

Guthrie et al. U.S. Appl. No. 14/871,671, filed Sep. 30, 2015, Non-Final Office Action dated Mar. 23, 2017.

Guthrie et al. U.S. Appl. No. 14/871,696, filed Sep. 30, 2015, Non-Final Office Action dated Mar. 22, 2017.

Guthrie et al. U.S. Appl. No. 14/871,696, filed Sep. 30, 2015, Notice of Allowance dated Jul. 13, 2017.

Guthrie et al. U.S. Appl. No. 14/871,671, filed Sep. 30, 2015, Final Office Action dated Aug. 16, 2017.

Guthrie et al. U.S. Appl. No. 14/839,264, filed Aug. 28, 2015, Notice of Allowance dated Dec. 16, 2016.

Guthrie et al. U.S. Appl. No. 14/871,682, filed Sep. 30, 2015, Notice of Allowance dated Dec. 21, 2016.

Guthrie et al. U.S. Appl. No. 14/839,356, filed Aug. 28, 2015, Notice of Allowance dated Dec. 27, 2016.

Guthrie et al. U.S. Appl. No. 14/871,709, filed Sep. 30, 2015, Notice of Allowance dated Jan. 5, 2017.

\* cited by examiner

| V 202 | Addr 204 | Byte enable (BE) 206 | Data 208 | G 210 | D 212 | HP 214 | Dependency matrix 216 |
|---|---|---|---|---|---|---|---|
| | | | | | | | |
| | | | | | | | |
| | | | ⋯ | | | | |
| | | | | | | | |
| | | | | | | | |

200 (brace under first columns)

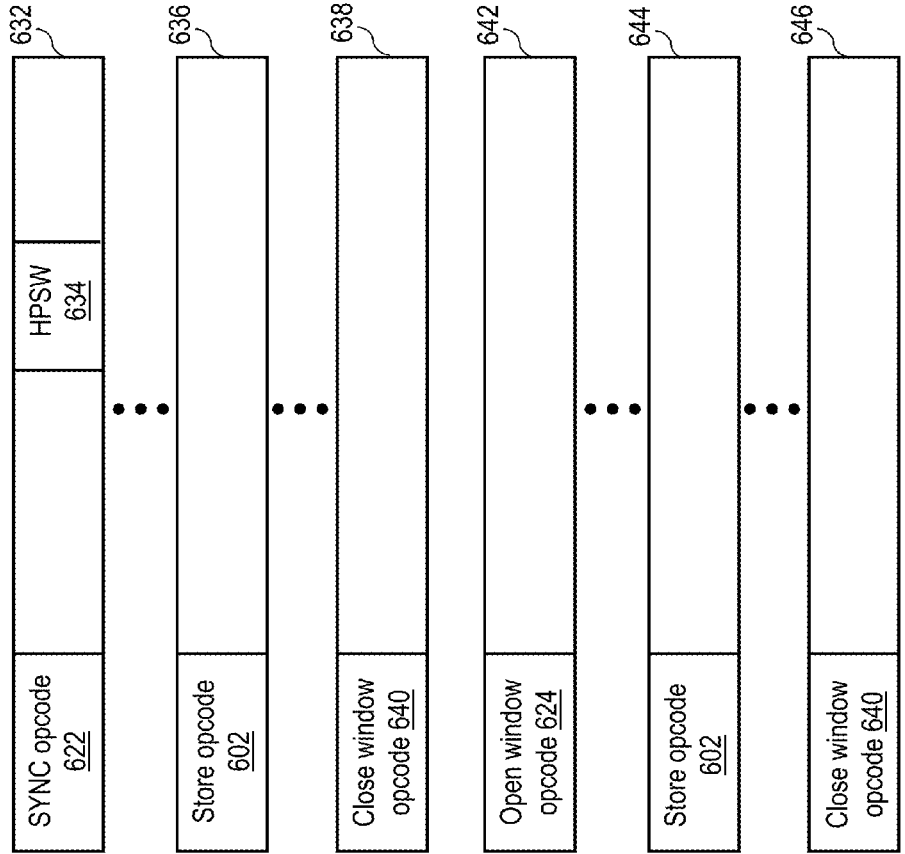

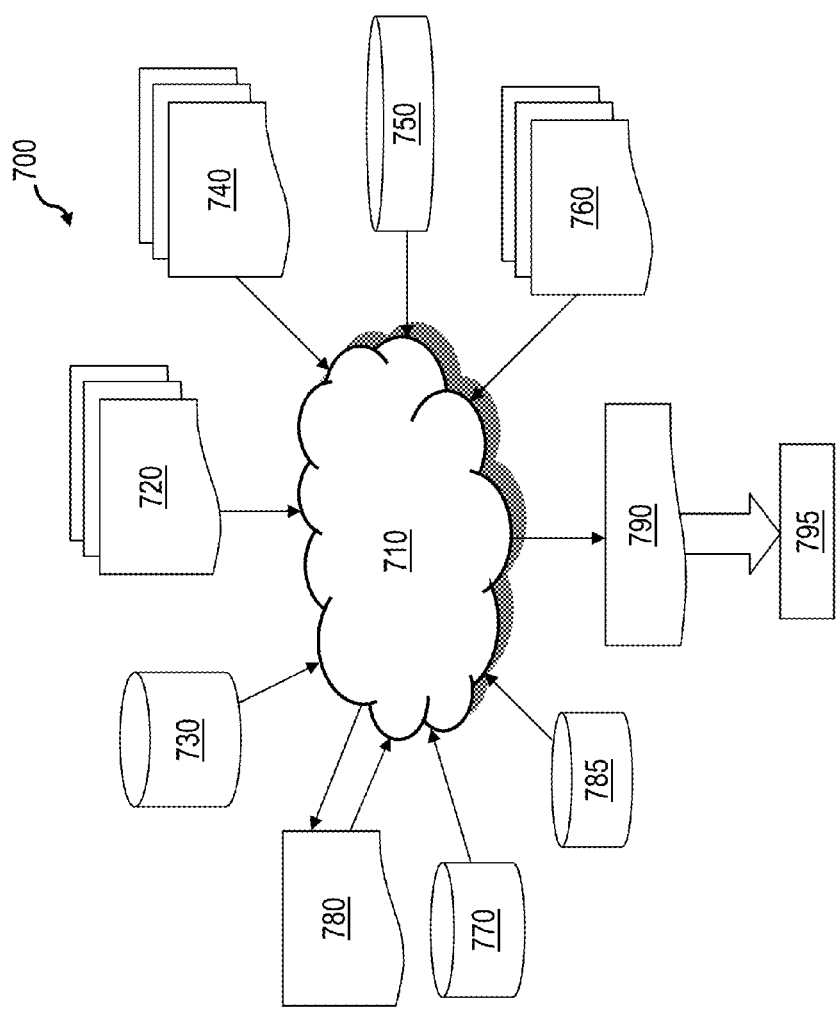

EXPEDITED SERVICING OF STORE OPERATIONS IN A DATA PROCESSING SYSTEM

BACKGROUND OF THE INVENTION

The present invention relates generally to data processing and, in particular, to expedited servicing of store operations in a data processing system.

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Lower-level caches (e.g., level two (L2) or level three (L3) caches) may be private to a particular processor core or shared by multiple processor cores.

In conventional MP computer systems, processor-issued store operations typically target only a small portion (i.e., 1 to 16 bytes) of a cache line rather than the entire cache line (e.g., 128 bytes). Consequently, an update to a cache line may include multiple individual store operations to sequential or non-sequential addresses within the cache line. In order to increase efficiency of store operations, processing units may include a coalescing store queue interposed between a processor core and a cache at which systemwide coherency is determined (e.g., the L2 cache), where the store queue provides byte-addressable storage for a number of cache lines (e.g., 8 to 16 cache lines). To reduce the number of store operations that must be performed in the cache (and potentially broadcast to other processing units), the store queue often implements "store gathering," which is the combination of multiple store operations into a single store queue entry prior to making an update to the corresponding cache line in the cache.

While generally beneficial in terms of reducing the overall number of store accesses to the cache, the present disclosure recognizes that conventional store gathering within the store queue necessarily delays the store accesses requested by some store operations until store gathering of the corresponding store queue entries completes. The present disclosure recognizes that in some cases the delay in servicing store accesses attributable to store gathering can negatively impact performance of other instructions and/or threads.

BRIEF SUMMARY

In at least some embodiments, a processor core generates a store operation by executing a store instruction in an instruction sequence. The store operation is marked as a high priority store operation in response to detecting, in the instruction sequence, a barrier instruction that precedes the store instruction in program order and that includes a field set to indicate the store operation should be accorded high priority and is not so marked otherwise. The store operation is buffered in a store queue associated with a cache memory of the processor core. Handling of the store operation in the store queue is expedited in response to the store operation being marked as a high priority store operation and not expedited otherwise.

BRIEF DESCRIPTION OF THE SEVERAL VIEWS OF THE DRAWINGS

FIG. 2 is a more detailed block diagram of an exemplary store queue in accordance with one embodiment;

FIGS. 6A-6F illustrate various instruction sequences that may be utilized to invoke expedited processing of store operations in accordance with one embodiment; and FIG. 7 is a data flow diagram illustrating a design process.

DETAILED DESCRIPTION

The present application discloses techniques for selectively expediting the processing of store operations generated by processor cores in the storage subsystem of a multiprocessor data processing system. In various embodiments, processing of selected processor store operations in the storage subsystem is expedited, inter alia, by reducing (including eliminating) store gathering for those particular store operations in a store queue and/or by prioritizing those particular store operations for dispatch from the store queue. Other non-expedited store operations can still remain subject to store gathering in the store queue and receive lower priority scheduling for dispatch from the store queue. In various embodiments, the store operations to be expedited can be marked as high priority store operations based on instruction marking by a programmer and/or compiler and/or circuitry in a processor core and/or based on operation marking determined by circuitry of a cache memory.

Figure 1:
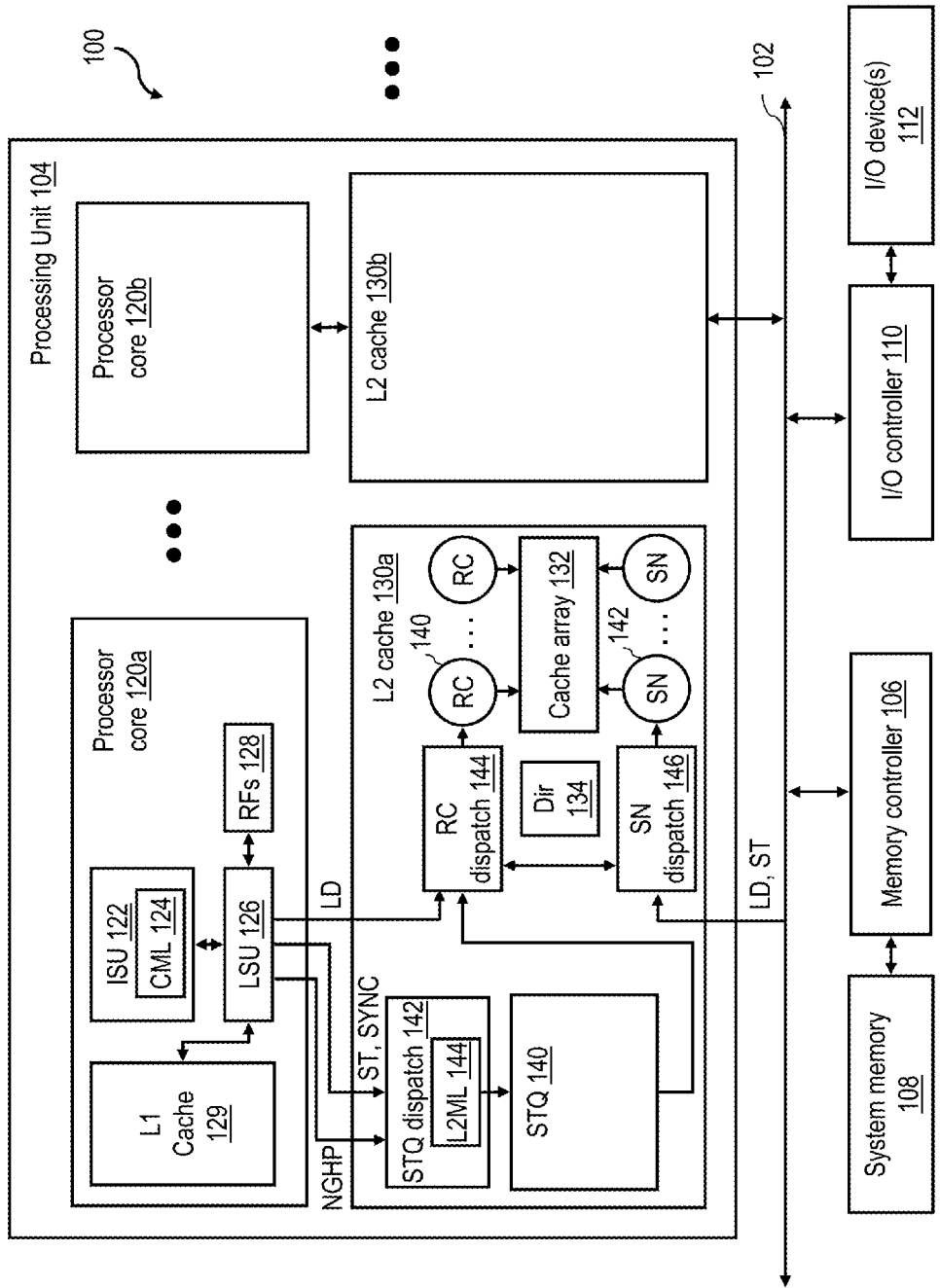
FIG. 1 is a high-level block diagram of an exemplary data processing system in accordance with one embodiment.

With reference now to the figures and in particular, with reference to FIG. 1, there is illustrated a multiprocessor (MP) data processing system 100 in accordance with one embodiment. MP data processing system 100 includes one or more (and preferably a plurality of) processing units 104, each of which may be realized as a single integrated circuit chip. Processing units 104 are coupled for communication by an interconnect 102, which may be implemented, for example, with one or more buses and/or switches.

Interconnect 102 is further communicatively coupled to a memory controller 106, which provides an interface to a system memory 108, and also to an input/output (I/O) controller 110, which provides an interface to one or more I/O devices 112. Data and instructions residing in system memory 108 can generally be accessed, cached and modified by a processor core in any processing unit 104 within data processing system 100. System memory 108 thus forms the lowest level of memory in the distributed shared memory system of data processing system 100.

Each processing unit 104 includes one or more processor cores 120 (e.g., processor cores 120a, 120b) for processing instructions and data. Although not required, in at least some embodiments, each processor core 120 is capable of independently executing multiple hardware threads of execution simultaneously. As depicted, each processor core 120 includes an instruction sequencing unit (ISU) 122 that fetches and orders instructions for execution and one or more execution units, such as load-store unit (LSU) 126, for executing instructions. ISU 122 includes core marking logic (CML) 124, which can mark instructions to expedite processing of selected store operations as described further below. The instructions executed by LSU 126 include memory access instructions that request load or store access to a memory block in the distributed shared memory system. Portions of memory blocks obtained from the distributed shared memory system by load accesses are buffered in one or more register files (RFs) 128, and portions of memory blocks updated by store accesses are written to the distributed shared memory system from the one or more register files 128.

The operation of each processor core 120 is supported by a multi-level volatile memory hierarchy having at its lowest level shared system memory 108, and at its upper levels, one or more levels of cache memory, which in the illustrative embodiment include a store-through level one (L1) cache 129 within and private to each processor core 120, and a respective store-in level two (L2) cache 130 (e.g., L2 caches 130a, 130b) for each processor core 120a, 120b. Although the illustrated cache hierarchies include only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache. The length of the cache lines held in the various levels of the cache hierarchy may vary between embodiments, but in at least one embodiment is 128 bytes.

In operation, when a hardware thread under execution by a processor core 120 includes a memory access instruction requesting a specified memory access operation to be performed, LSU 126 executes the memory access instruction to determine the target address (e.g., an effective address) of the memory access request. After translation of the target address to a real address corresponding to a storage location in system memory 108, L1 cache 129 is accessed utilizing the target address. Assuming the indicated memory access cannot be satisfied solely by reference to L1 cache 129, LSU 126 then transmits the memory access operation, which includes at least a transaction type (ttype) (e.g., load or store), the target real address, and if a store operation, the store data, to its affiliated L2 cache 130 for servicing.

Still referring to FIG. 1, L2 cache 130 includes a cache array 132 and a directory 134 of the contents of cache array 132. Assuming cache array 132 and directory 134 are set-associative as is conventional, memory locations in system memory 108 are mapped to particular congruence classes within cache array 132 utilizing predetermined index bits within the system memory (real) addresses. The particular memory blocks stored within the cache lines of cache array 132 are recorded in cache directory 134, which contains one directory entry for each cache line.

L2 cache 130 also includes a coalescing store queue (STQ) 140 interposed between processor core 120 and cache array 132. STQ 140 includes multiple entries for buffering store and barrier (e.g., SYNC) operations to be performed with respect to the distributed shared memory system. Store and barrier operations are loaded into STQ 140 by STQ dispatch logic 142, which includes L2 marking logic (L2ML) 144. L2ML 144 marks entries of STQ to expedite processing of selected store operations as described in detail below. L2 cache 130 additionally includes multiple (e.g., 16) Read-Claim (RC) machines 140 for independently and concurrently servicing load (LD) and store (ST) operations originating from the affiliated processor core 120. In addition, L2 cache 130 includes multiple snoop (SN) machines 142 that can independently and concurrently handle remote memory access requests of other processor cores 120 that are snooped from interconnect 102. Store operations buffered within STQ 140 and load operations received from the affiliated processor core 120 are dispatched to RC machines 140 for processing in accordance with a prioritization and scheduling determined by RC dispatch logic 144. Similarly, memory access requests snooped from interconnect 102 are dispatched to SN machines 142 for processing in accordance with a prioritization and scheduling determined by SN dispatch logic 146.

Those skilled in the art will appreciate that MP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Referring now to FIG. 2, there is depicted an exemplary store queue (STQ) 140 in accordance with one embodiment. As illustrated, STQ 140 includes multiple entries 200, each including multiple fields. These fields include a valid field 202 indicating whether the contents of the entry 200 are valid, an address field 204 for storing a real address of a cache line to which a store operation is to be performed, a byte enable (BE) field 206 for indicating which byte(s) of the cache line are to be updated with store data, a data field 208 for buffering store data to be written to the cache line identified by the real address within address field 204, and a dependency matrix field 216 that tracks data dependencies between entries 200.

In addition, each STQ entry 200 includes a number of control fields, including a gatherable field 210 indicating whether or not additional store operations can be gathered within the entry 200, a dispatchable field 212 indicating whether or not the store operation specified by entry 200 may be dispatched by RC dispatch logic 144 to an RC machine 140 for service, and a high priority field 214 indicating a priority of the store operation contained in the entry 200. Although embodiments are described herein that employ two priorities—a high priority and a low priority—it should be appreciated that in alternative embodiments one or more additional priorities for store operations may be employed.

There are a variety of instruction sequences for which it may be desirable to expedite processing of store operations by assigning those store operations a high priority. For example, consider the following instruction sequence, which terminates with a store that releases a lock controlling access to a critical section:

| | |
|---|---|
| <acquire LOCK> | // implementation-specific lock acquisition instruction sequence |
| SYNC | // ensures critical section memory accesses follow LOCK<br>// aquisition |
| ST A | // critical section store instruction |
| LD B | // critical section load instruction |
| ST C | // critical section store instruction |
| LD D | // critical section load instruction |
| SYNC | // barrier instruction guaranteeing completion of critical section<br>// prior to any subsequent stores |
| ST LOCK, 0 | // store instruction releasing LOCK of critical section |

In this example, the lock and associated barriers synchronize access to a critical section, ensuring that only one hardware thread at a time can make memory accesses to the critical section. Because a next hardware thread seeking access to the critical section cannot obtain such access until the lock is released, it would be desirable if processing of the store operation corresponding to the store instruction that releases the lock controlling access to the critical section is expedited.

As a second example, it may also be desirable to expedite a store operation that indicates the availability of a control block, as shown in the following instruction sequence:

| | |
|---|---|
| ST A | // build control block dataset |
| ST B | // build control block dataset |
| ST C | // build control block dataset |
| SYNC | // barrier instruction guaranteeing completion of preceding stores<br>// prior to any subsequent stores |
| ST FLAG, 1 | // indicate availability of control block by setting the FLAG |

In this second example, the state of the flag indicates to other hardware threads that a control block is ready for use. Because the work of threads dependent on the availability of the control block is delayed until the flag is set, it would be desirable if processing of the store operation corresponding to the store instruction that sets the flag is expedited.

A similar third example, given in the following code sequence, illustrates that it may also be desirable to expedite the processing of a set of multiple store operations corresponding to multiple processor store instructions:

| | |
|---|---|
| ST A | // build dataset of control block 1 |
| ST B | // build dataset of control block 2 |
| ST C | // build dataset of control block 3 |
| SYNC | // barrier instruction guaranteeing completion of preceding stores<br>// prior to any subsequent stores |
| ST FLAG1, 1 | // indicate availability of control block 1 |
| ST FLAG2, 1 | // indicate availability of control block 2 |
| ST FLAG3, 1 | // indicate availability of control block 3 |

Again, because the work of threads dependent on the availability of the control blocks is delayed until the corresponding flags are set, it would be desirable if processing of the store operations corresponding to the store instructions that set the flags is expedited.

Figure 3:
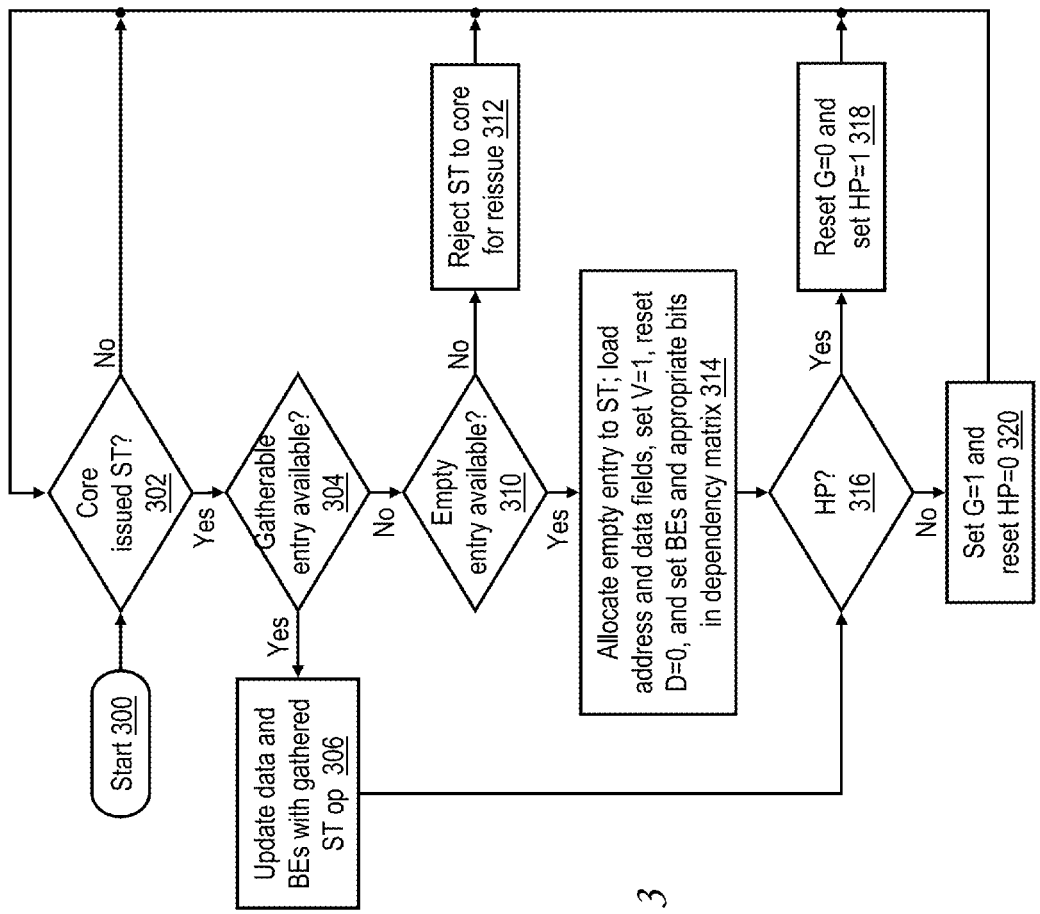
FIG. 3 is a high level logical flowchart of an exemplary process for dispatching store operations to a store queue in accordance with one embodiment.

In at least some embodiments, processing of store operations is expedited by an L2 cache 130 through the way in which store operations are handled within and dispatched from STQ 140, described in detail with reference to FIGS. 3-5. With reference first to FIG. 3, there is a high level logical flowchart of an exemplary process of dispatching store operations into STQ 140 in accordance with one embodiment. The illustrated process can be performed, for example, by integrated circuitry within STQ dispatch logic 142.

The process begins at block 300 and proceeds to block 302, which depicts STQ dispatch logic 142 monitoring for receipt of a store operation from its affiliated processor core 120. If no store operation has been received, the process iterates at block 302. In response to receipt of a store operation from the affiliated processor core 120, STQ dispatch logic 142 determines at block 304 whether or not a gatherable entry 200 is available in STQ 140, that is, whether STQ 140 contains an entry 200 for which valid field 202 is set (e.g., to 1), the address field 204 contains a real address that matches that of the received store operation, and gatherable field 210 is set (e.g., to 1). In response to a determination that STQ 140 has a gatherable entry 200 available, STQ dispatch logic 142 gathers the received store operation into the gatherable entry 200 by updating byte enable field 206 and data field 208 to reflect the bytes updated by the store data of the received store operation (block 306). The process proceeds from block 306 to block 316, which is described below.

In response to a determination at block 304 that no gatherable entry 200 is available in STQ 140, STQ dispatch logic 142 determines at block 310 whether or not an empty entry 200 (i.e., one having a reset valid field 202) is available in STQ 140. In response to a negative determination at block 310, meaning STQ 140 is full, STQ dispatch logic 142 rejects the store operation received at block 302 by transmitting a message (or signal) to the affiliated processor core 120 (block 312). The processor core 120 can thereafter reissue the store operation to STQ dispatch logic 142. Following block 312, the process of FIG. 3 returns to block 302.

Returning to block 310, in response to STQ dispatch logic 142 determining that an empty entry 200 is available in STQ 140, the process proceeds to block 314, which illustrates STQ dispatch logic 142 allocating the empty entry 200 to the store operation received at block 302 and loading the address field 204 and data field 208 with the real address ands store data specified by the store operation. In addition, STQ dispatch logic 142 sets valid field 202 (e.g., to 1), resets dispatchable field 212 (e.g., to 0), sets BE field 206 to identify the bytes modified with store data, and sets the appropriate bits, if any, in dependency matrix field 216 to indicate any dependency between the new entry 200 and other valid entries 200 of STQ 140. A new entry 200 is dependent on another entry 200 if, among other things, the store operation buffered in the new entry 200 accesses the same real address as the other entry 200 or must be synchronized with the store operation of the other entry 200 due to the ordering requirements of a barrier operation (e.g., SYNC).

The process proceeds from block 314 to block 316, which illustrates STQ dispatch logic 142 determining whether or not the store operation received at block 302 is a high priority (HP) store operation. As discussed below with reference to FIGS. 6A-6F, the store operation can be identified as a high priority store operation and marked accordingly by a programmer and/or compiler and/or circuitry in a processor core (e.g., CML 124) and/or based on operation marking determined by circuitry of a cache memory (e.g., L2ML 144). In response to determining at block 316 that the store operation is not a high priority store operation, STQ dispatch logic 142 sets gatherable field 210 (e.g., to 1) to indicate that the entry 200 allocated to the store operation can be utilized to gather additional store operations and resets high priority field 214 (e.g., to 0) to indicate that the entry 200 does not contain a high priority store operation (block 320). However, in response to determining at block 316 that the store operation is a high priority store operation, STQ dispatch logic 142 resets gatherable field 210 (e.g., to 0) to indicate that the entry 200 allocated to the store operation cannot be utilized to gather additional store operations and sets high priority field 214 (e.g., to 1) to indicate that the entry 200 contains a high priority store operation (block 318). As will be appreciated, by making entries 200 allocated to high priority store operations non-gatherable, the store operations are not delayed by the store gathering window associated with low priority store operations and can thus be made dispatchable more quickly, as explained further below with reference to FIG. 4. Following block 318 or block 320, the process returns to block 302, which has been described.

Figure 4:
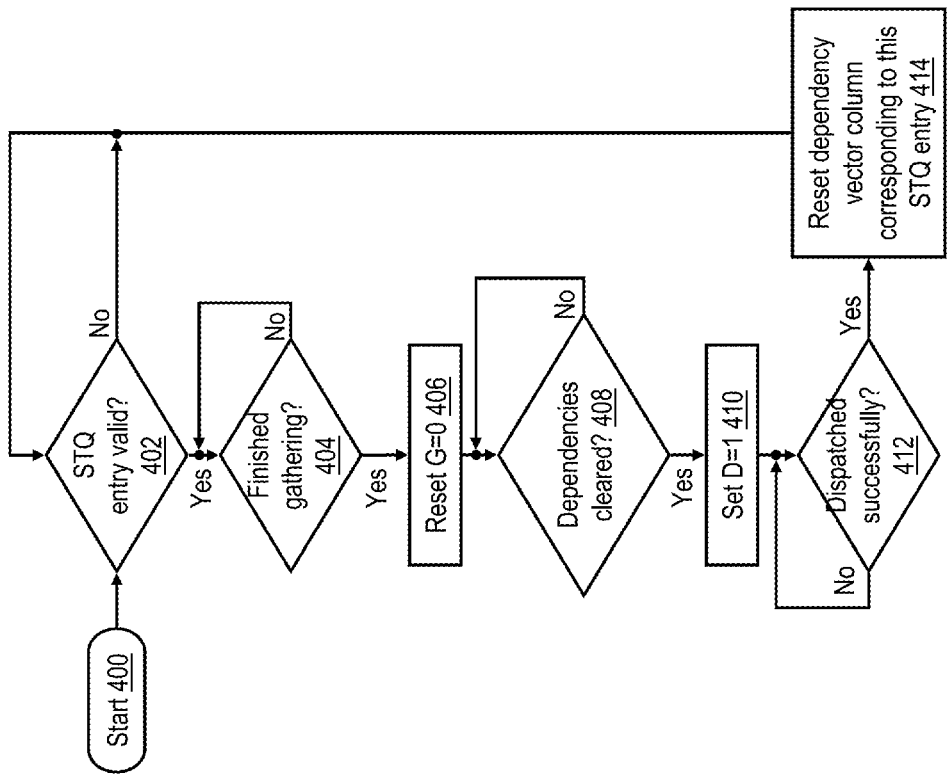
FIG. 4 is a high level logical flowchart of an exemplary process for processing an entry of a store queue in accordance with one embodiment.

Referring now to FIG. 4, there is illustrated a high level logical flowchart of an exemplary process for processing an entry of STQ 140 in accordance with one embodiment. Instances of the process depicted in FIG. 4 are performed by STQ 140 in parallel for all store queue entries 200. The illustrated process can be performed, for example, by integrated circuitry within STQ 140.

The process of FIG. 4 begins at block 400 and proceeds to block 402, which illustrates STQ 140 determining whether or not a particular STQ entry 200 is valid (i.e., valid field 202 is set to 1). In response to a determination at block 402 that the STQ entry 200 is not valid, the process returns to block 402 and proceeds in an iterative fashion. If, however, STQ 140 determines at block 402 that the entry 200 is valid, the process proceeds to block 404, which depicts STQ 140 determining whether or not store gathering for the entry has finished. For entries 200 buffering high priority store operations, no gathering is permitted (as indicated by gatherable field 210 being reset to 0), and an affirmative determination will always be made at block 404. For entries 200 buffering low priority store operations, the determination at block 404 may be made, for example, based on the elapsing of fixed length store gathering window and/or on the elapsing of a store gathering interval since a most recent store operation was gathered into the entry 200 or some other means.

In response to a negative determination at block 404, the process of FIG. 4 iterates at block 404. In response to an affirmative determination at block 404, STQ 140 resets gatherable field 210 (e.g., to 0) to indicate that the entry 200 is non-gatherable (block 406). At block 408, STQ 140 also determines whether or not dependency matrix field 216 indicates that all the dependencies, if any, associated with the entry 200 have been cleared (e.g., by the other entry or entries 200 on which the subject entry 200 was dependent being dispatched from STQ 140). If not, the process iterates at block 408. However, in response to a determination that dependency matrix field 216 indicates that all dependencies, if any, of the subject entry 200 have been cleared, STQ 140 marks the entry 200 as available for dispatch, for example, by setting dispatchable field 212 to 1 (block 410).

The process proceeds from block 410 to block 412, which illustrates STQ 140 determining whether the store operation buffered in the entry 200 has been successfully dispatched, for example, by the process of FIG. 5, which is described below. In at least some embodiments, the successful dispatch of the store operation is signaled to STQ 140 by an RC machine 140 sending a "dispatch complete" signal to STQ 140 in response to receipt of a store operation to be serviced. In response to STQ 140 determining that the store operation buffered in the entry 200 has not yet been successfully dispatched, the process iterates at block 412. However, in response to a determination at block 412 that the store operation buffered in the entry 200 has been successfully dispatched, STQ 140 resets a column in dependency vector field 216 corresponding to the entry 200, thus freeing any dependency of other entries 200 on the entry 200 (block 414). Thereafter, the process of FIG. 4 returns to block 402 and continues in an iterative fashion.

Figure 5:
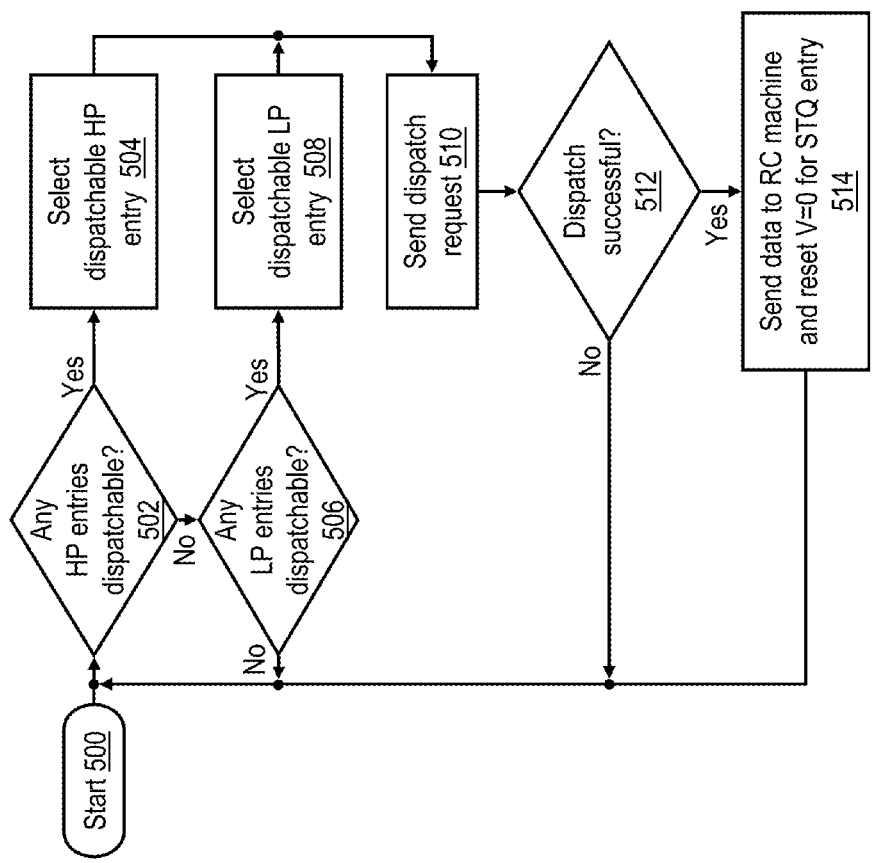
FIG. 5 is a high level logical flowchart of an exemplary process for dispatching an entry of a store queue for service by a cache in accordance with one embodiment.

With reference now to FIG. 5, there is illustrated a high level logical flowchart of an exemplary process for dispatching an entry of a store queue for service by a cache in accordance with one embodiment. The illustrated process can be performed, for example, by integrated circuitry within RC dispatch logic 144.

The process of FIG. 5 begins at block 500 and continues to block 502, which illustrates RC dispatch logic 144 determining whether or not any STQ entry or entries 200 marked by high priority field 214 as buffering high priority store operations are eligible for dispatch (e.g., have valid field 202 and dispatchable field 212 both set to 1). In response to a determination that at least one high priority entry 200 in STQ 140 is presently available for dispatch, RC dispatch logic 144 selects one of the dispatchable high priority entries 200 for dispatch, as shown at block 504. The selection can be made from among the dispatchable entries, for example, based on pseudo-random selection, round robin selection, the relative ages of the entries 200 buffering high priority store operations, relative priority levels (if applicable) of the high priority store operations, and/or another selection methodology. The process then proceeds to block 510, which is described below.

Returning to block 502, in response to a determination that no high priority entry 200 is available for dispatch, the process proceeds to block 506, which illustrates a further determination of whether or not any STQ entry or entries 200 buffering low priority store operations is available for dispatch. In response to a negative determination at block 506, the process of FIG. 5 returns to block 502, which has been described. However, if at least one low priority entry 200 is available for dispatch, the RC dispatch logic 144 selects one dispatchable low priority entry 200 for dispatch, for example, based on pseudo-random selection, round robin selection, the relative ages of the entries 200 buffering low priority store operations, relative priority levels (if applicable) of the low priority store operations, and/or another selection methodology (block 508). The process then proceeds to block 510.

Block 510 depicts RC dispatch logic 144 sending to an RC machine 140 a dispatch request including the real address of the store operation from the selected entry 200. At block 512, RC dispatch logic 144 determines whether or not dispatch of the store operation from the selected entry 200 was successful, for example, as indicated by a "dispatch complete" signal received from the RC machine 140. If not, the process returns to step 502 and proceeds in an iterative fashion. If, however, RC dispatch logic 144 determines that the dispatch of the store operation from the entry 200 was successful, RC dispatch logic 144 sends the store data buffered in data field 208 of the selected entry 200 to the RC machine 140 and marks the selected entry as invalid by resetting valid field 202 (e.g., to 0) (block 514). The steps illustrated at block 514 of FIG. 5 result in a determination of successful dispatch at block 412 of FIG. 4. Following block 514, the process of FIG. 5 returns to step 502 and proceeds in an iterative fashion.

In response to receipt of the store operation, the RC machine 140 to which the store operation is dispatched performs the store operation by obtaining, if necessary, write permission, obtaining, if necessary, a copy of the target cache line, and updating the target cache line in cache array 132 with the store data of the store operation. It should be appreciated by the foregoing that processing of high priority store operations can be expedited by reducing (or eliminating) the store gathering delay (as shown at block 404 of FIG. 4), making the store operations dispatchable as soon as possible. The processing of high priority store operations can also be expedited by preferentially selecting the high priority store operations for dispatch from the store queue (as shown at blocks 502-504 of FIG. 5). It should be understood that these two techniques of expediting processing of store operations in a coalescing store queue (i.e., reducing (or eliminating) the store gathering delay and preferentially selecting store operations for dispatch) can be used independently or in combination. Further, the technique or techniques of expediting processing of store operations can be selectable.

As noted above, a variety of techniques can be utilized to determine that store operations are high priority and to mark the store operations accordingly. A few of these techniques will now be described with reference to FIGS. 6A-6F, which illustrate various instruction sequences that may be utilized to invoke expedited processing of store operations in accordance with one embodiment.

Figure 6A:

Referring first to FIG. 6A, a first instruction sequence that may be utilized to invoke expedited processing of a store operation includes one or more instructions including a store instruction 600. Store instruction 600 includes a store opcode (operation code) 602 and a non-gatherable, high priority (NGHP) field 604 that can be utilized to explicitly mark store instruction 600 as generating a high priority store operation. As will be appreciated, NGHP field 604 can be set (e.g., to 1) by a programmer or a compiler to mark store instruction 600 as generating a high priority store operation. A compiler may set NGHP field 604, for example, in response to recognizing a predetermined instruction sequence including store instruction 600.

In response to detecting NGHP field 604 being set, LSU 126 can assert a NGHP signal (see, e.g., FIG. 1) to STQ dispatch logic 142 in conjunction with transmission of the store operation corresponding to store instruction 600. Assertion of the NGHP signal by LSU 126 causes STQ dispatch logic 142 to implement expedited processing of the STQ entry 200 allocated to the store operation, as described above with reference to FIG. 3.

Figure 6B:
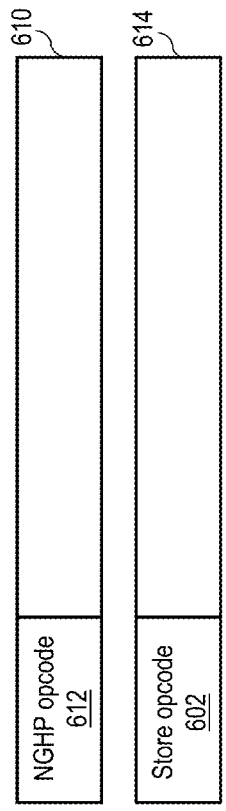

Referring next to FIG. 6B, a second instruction sequence that may be utilized to invoke expedited processing of a store operation includes multiple instructions including a NGHP precursor instruction 610 followed in program order by a store instruction 614. NGHP precursor instruction 610 includes an NGHP opcode 612 signifying that, if NGHP precursor instruction 610 is immediately followed by a store instruction 614, the store operation generated by execution of the immediately following store instruction 614 should be accorded high priority. NGHP instruction 610 can be inserted into the instruction sequence, for example, by a programmer or a compiler. A compiler may insert NGHP instruction 610 into the instruction sequence, for example, in response to recognizing a predetermined instruction sequence including store instruction 614.

In response to detecting an instruction sequence in which a NGHP instruction 610 is immediately followed in program order by a store instruction 614, CML 124 preferably causes LSU 126 to assert the NGHP signal to STQ dispatch logic 142 in conjunction with transmission of the store operation corresponding to store instruction 614. As noted above, assertion of the NGHP signal by LSU 126 causes STQ dispatch logic 142 to implement expedited processing of the STQ entry 200 allocated to the store operation, as described above with reference to FIG. 3. In cases in which NGHP instruction 610 is not immediately followed in program order by a store instruction 614, processor core 120 preferably handles NGHP instruction 610 as a noop.

Figure 6C:
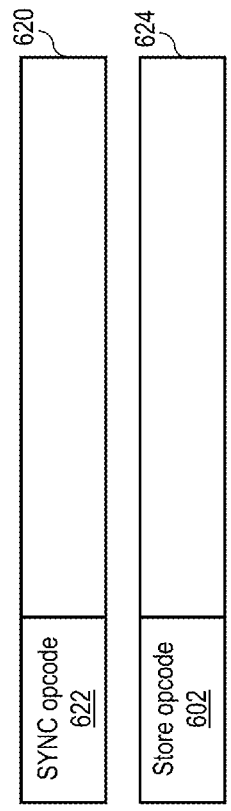

With reference now to FIG. 6C, a third instruction sequence that may be utilized to invoke expedited processing of a store operation includes multiple instructions including a barrier instruction 620 (in this case, a SYNC instruction denoted by a SYNC opcode 622) immediately followed in program order by a store instruction 624. In this case, processing of barrier instruction 620 in processor core 120 causes LSU 126 to transmit a corresponding barrier (e.g., SYNC) operation to STQ dispatch logic 142. In addition, the store operation generated by execution of the store instruction 624 is accorded high priority under the presumption that a store operation following a barrier, which may perform important work such as releasing a lock or setting a flag, should be given high priority.

In one embodiment, high priority is accorded to the store operation corresponding to store instruction 624 by processor core 120. In this embodiment, in response to detecting an instruction sequence in which a barrier instruction, such as SYNC instruction 620, is immediately followed in program order by a store instruction 624, CML 124 causes LSU 126 to assert a NGHP signal to STQ dispatch logic 142 in conjunction with transmission of the store operation corresponding to store instruction 624. As noted above, assertion of the NGHP signal by LSU 126 causes STQ dispatch logic 142 to implement expedited processing of the STQ entry 200 allocated to the store operation, as described above with reference to FIG. 3.

In an alternative embodiment, high priority is instead accorded to the store operation corresponding to store instruction 624 by L2 cache 130. In this embodiment, the barrier (e.g., SYNC) operation corresponding to SYNC instruction 620 and the store operation corresponding to store instruction 624 are both received by STQ dispatch logic 142. In this embodiment, L2ML 144 detects the ordering of the barrier and store operations and causes STQ dispatch logic 142 to implement expedited processing of the STQ entry 200 allocated to the store operation, as described above with reference to FIG. 3.

Figure 6D:
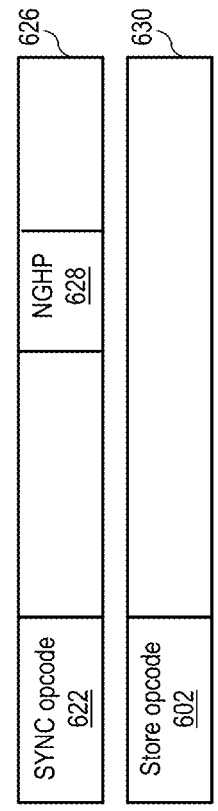

FIG. 6D depicts a fourth instruction sequence that may be utilized to invoke expedited processing of a store operation. The fourth instruction sequence, which includes multiple instructions including a barrier instruction 626 immediately followed in program order by a store instruction 630, is the similar to the third instruction sequence given in FIG. 6C, except that the store operation generated by execution of the store instruction 630 immediately following barrier instruction 626 is selectively accorded high priority based on whether or not a NGHP field 628 is set (e.g., to 1) or reset (e.g., to 0).

In one embodiment, high priority is accorded to the store operation corresponding to store instruction 630 by processor core 120. In this embodiment, in response to detecting that NGHP field 628 of barrier instruction 626 is set, CML 124 causes LSU 126 to assert a NGHP signal to STQ dispatch logic 142 in conjunction with transmission of the store operation corresponding to store instruction 630. As noted above, assertion of the NGHP signal by LSU 126 causes STQ dispatch logic 142 to implement expedited processing of the STQ entry 200 allocated to the store operation, as described above with reference to FIG. 3.

In an alternative embodiment, high priority is instead accorded to the store operation corresponding to store instruction 630 by L2 cache 130. In this embodiment, the barrier (e.g., SYNC) operation corresponding to barrier instruction 626 includes a control bit corresponding to the setting of the NGHP field 628 of barrier instruction 626. In this embodiment, L2ML 144 detects the setting of the control bit within the barrier operation and causes STQ dispatch logic 142 to implement expedited processing of the STQ entry 200 allocated to the following store operation if the control bit of the barrier operation is set (e.g., to 1) and otherwise causes STQ dispatch logic 142 to not implement expedited processing for the STQ entry 200.

With reference now to FIGS. 6E-6F, there are illustrated fifth and sixth instruction sequences that may be utilized to invoke expedited processing of one or more store operations within a high priority store window. These exemplary instruction sequences may be useful, for example, in code sequences in which multiple locks are to be released or multiple flags are to be set to indicate the availability of multiple corresponding control blocks.

Referring specifically to FIG. 6E, the fifth instruction sequence includes a barrier (e.g., SYNC) instruction having a SYNC opcode 622 and a high priority store window (HPSW) field 634. Barrier instruction 632 is followed in program order by one or more store instructions 636 and a HPSW closing instruction 638 denoted by a close window opcode 640. If HPSW field 634 of barrier instruction 632 is set (e.g., to 1), the store operations generated by the execution of all store instruction(s) 636 within the HPSW bounded by barrier instruction 632 and HPSW closing instruction 638 are accorded high priority. If, on the other hand, HPSW field 634 of barrier instruction 632 is reset (e.g., to 0), no HPSW is initiated, and the store operations generated by execution of store instruction(s) 636 are instead accorded low priority.

In one embodiment, high priority is accorded to the store operation(s) corresponding to store instruction(s) 636 by processor core 120. In this embodiment, in response to detecting that HPSW field 634 of barrier instruction 632 is set, CML 124 causes LSU 126 to assert a NGHP signal to STQ dispatch logic 142 in conjunction with transmission of the store operation(s) corresponding to store instruction(s) 636. As noted above, assertion of the NGHP signal by LSU 126 causes STQ dispatch logic 142 to implement expedited processing of the STQ entry 200 allocated to the store operation, as described above with reference to FIG. 3.

In an alternative embodiment, high priority is instead accorded to the store operation(s) corresponding to store instruction(s) 636 by L2 cache 130. In this embodiment, the barrier (e.g., SYNC) operation corresponding to barrier instruction 632 includes a control bit corresponding to the setting of the HPSW field 634 of barrier instruction 632. In this embodiment, L2ML 144 detects the setting of the control bit within the barrier operation and causes STQ dispatch logic 142 to implement expedited processing of the STQ entry or entries 200 allocated to the following store operations if the control bit of the barrier operation is set (e.g., to 1) and otherwise causes STQ dispatch logic 142 to not implement expedited processing of the STQ entry or entries 200.

In either of these embodiments, the close window instruction 638 terminating the HPSW can be recognized by either CML 124 or L2ML 144. In response to detection of close window instruction 638, CML 124 or L2ML 144 causes STQ dispatch logic 142 to accord following store operations low priority (until a high priority store operation is again detected).

With reference now to FIG. 6F, the sixth instruction sequence includes a HPSW opening instruction 642 having an open window opcode 624. Window opening instruction 642 is followed in program order by one or more store instructions 644 and a HPSW closing instruction 646. The sixth instruction sequence given in FIG. 6F is similar to the fifth instruction sequence given in FIG. 6E, except that the HPSW is initiated by HPSW opening instruction 642 rather than a HPSW field 634 in a barrier instruction 632. High priority can be accorded the store operations generated by the store instructions 644 within the HPSW by processor core 120 or L2 cache 130, as described above.

With reference now to FIG. 7, there is depicted a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of the design structures and/or devices described above and shown herein. The design structures processed and/or generated by design flow 700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 1020 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown herein. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures shown herein to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 790 may comprise a compiled, executable HDL simulation model that functionally simulates the devices shown herein.

Design structure 790 may also employ a data format used for the exchange of layout data of integrated circuits and/or symbolic data format (e.g., information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 790 may then proceed to a stage 795 where, for example, design structure 790: proceeds to tape-out, is released to manufacturing, is released to a mask house, is sent to another design house, is sent back to the customer, etc.

As has been described, in at least one embodiment, a processor core generates a store operation by executing a store instruction in an instruction sequence. The store operation is marked as a high priority store operation, for example, in response to the store instruction being marked as high priority and is not so marked otherwise. The store operation is buffered in a store queue associated with a cache memory of the processor core. Handling of the store operation in the store queue is expedited in response to the store operation being marked as a high priority store operation and not expedited otherwise.

The store operation may alternatively or additionally be marked as high priority in response to detection of a precusor instruction preceding the store instruction in program order, in response to detection of a preceding barrier instruction (which may explicitly designate the store operation of the store instruction as high priority), and/or in response to the store instruction falling within a high priority store window bounded by instructions that open and close a high priority store window.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like, but excludes signal media.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit, comprising:
   a processor core including:
      an instruction sequencing circuit that orders instructions for execution; and
      an execution circuit that generates a store operation by executing a store instruction in an instruction sequence;
   a cache memory including a cache array and a store queue for buffering store operations to be serviced with respect to the cache array; and
   a marking circuit within at least one of set including the processor core and the cache memory, wherein the marking circuit selectively marks the store operation as a high priority store operation, wherein the marking circuit marks the store operation as a high priority store operation in response to detecting, in the instruction sequence, a precursor instruction that precedes the store instruction in program order and that includes an opcode field indicating the store operation should be accorded high priority, and wherein the marking circuit refrains from marking the store operation as a high priority store operation in response to not detecting, in the instruction sequence, a precursor instruction that precedes the store instruction in program order and that includes an opcode field indicating the store operation should be accorded high priority;
   wherein the cache memory expedites handling of the store operation in the store queue in response to the store operation being marked as a high priority store operation and otherwise refrains from expediting handling of the store operation in the store queue.

2. The processing unit of claim 1, wherein the marking circuit includes a core marking circuit within the processor core.

3. The processing unit of claim 1, wherein the marking circuit includes a marking circuit within the cache memory.

4. The processing unit of claim 1, and further comprising:
   a store queue dispatch circuit that records the store operation in an entry of the store queue; and
   wherein the store queue dispatch circuit expedites handling of the store operation by reducing a duration of store gathering applied to the entry of the store queue in response to the store operation being marked as a high priority store operation.

5. The processing unit of claim 4, wherein reducing the duration of the store gathering comprises terminating store gathering for the entry.

6. The processing unit of claim 1, and further comprising:
   a store queue dispatch that records the store operation in an entry of the store queue; and
   a read-claim dispatch circuit that expedites handling of the store operation by preferentially selecting the entry of the store queue for dispatch for servicing by reference to the cache array in response to the store operation being marked as a high priority store operation.

7. A data processing system, comprising:
   a plurality of processing units in accordance with claim 1; and
   an interconnect fabric coupling the plurality of processing units.

8. A design structure tangibly embodied in a machine-readable storage device for designing, manufacturing, or testing an integrated circuit, the design structure comprising:
   a processor core including:
      an instruction sequencing circuit that orders instructions for execution; and
      an execution circuit that generates a store operation by executing a store instruction in an instruction sequence;
   a cache memory including a cache array and a store queue for buffering store operations to be serviced with respect to the cache array; and
   a marking circuit within at least one of set including the processor core and the cache memory, wherein the marking circuit selectively marks the store operation as a high priority store operation, wherein the marking circuit marks the store operation as a high priority store operation in response to detecting, in the instruction sequence, a precursor instruction that precedes the store instruction in program order and that includes an opcode field indicating the store operation should be accorded high priority, and wherein the marking circuit refrains from marking the store operation as a high priority store operation in response to not detecting, in the instruction sequence, a precursor instruction that precedes the store instruction in program order and that includes an opcode field indicating the store operation should be accorded high priority;
   wherein the cache memory expedites handling of the store operation in the store queue in response to the store operation being marked as a high priority store operation and otherwise refrains from expediting handling of the store operation in the store queue.

9. The design structure of claim 8, wherein the marking circuit includes a core marking circuit within the processor core.

10. The design structure of claim 8, wherein the marking circuit includes a marking circuit within the cache memory.

11. The design structure of claim 8, and further comprising:
    a store queue dispatch circuit that records the store operation in an entry of the store queue; and
    wherein the store queue dispatch circuit expedites handling of the store operation by reducing a duration of store gathering applied to the entry of the store queue in response to the store operation being marked as a high priority store operation.

12. The design structure of claim 11, wherein reducing the duration of the store gathering comprises terminating store gathering for the entry.

13. The design structure of claim 8, and further comprising:
    a store queue dispatch circuit that records the store operation in an entry of the store queue; and
    a read-claim dispatch circuit that expedites handling of the store operation by preferentially selecting the entry of the store queue for dispatch for servicing by reference to the cache array in response to the store operation being marked as a high priority store operation.

* * * * *